April 1, 1930.  B. HALL ET AL  1,752,738
WINDING MECHANISM, PARTICULARLY ADAPTED FOR PATTERN SETTING FRAMES
Filed Nov. 30, 1926  6 Sheets-Sheet 1
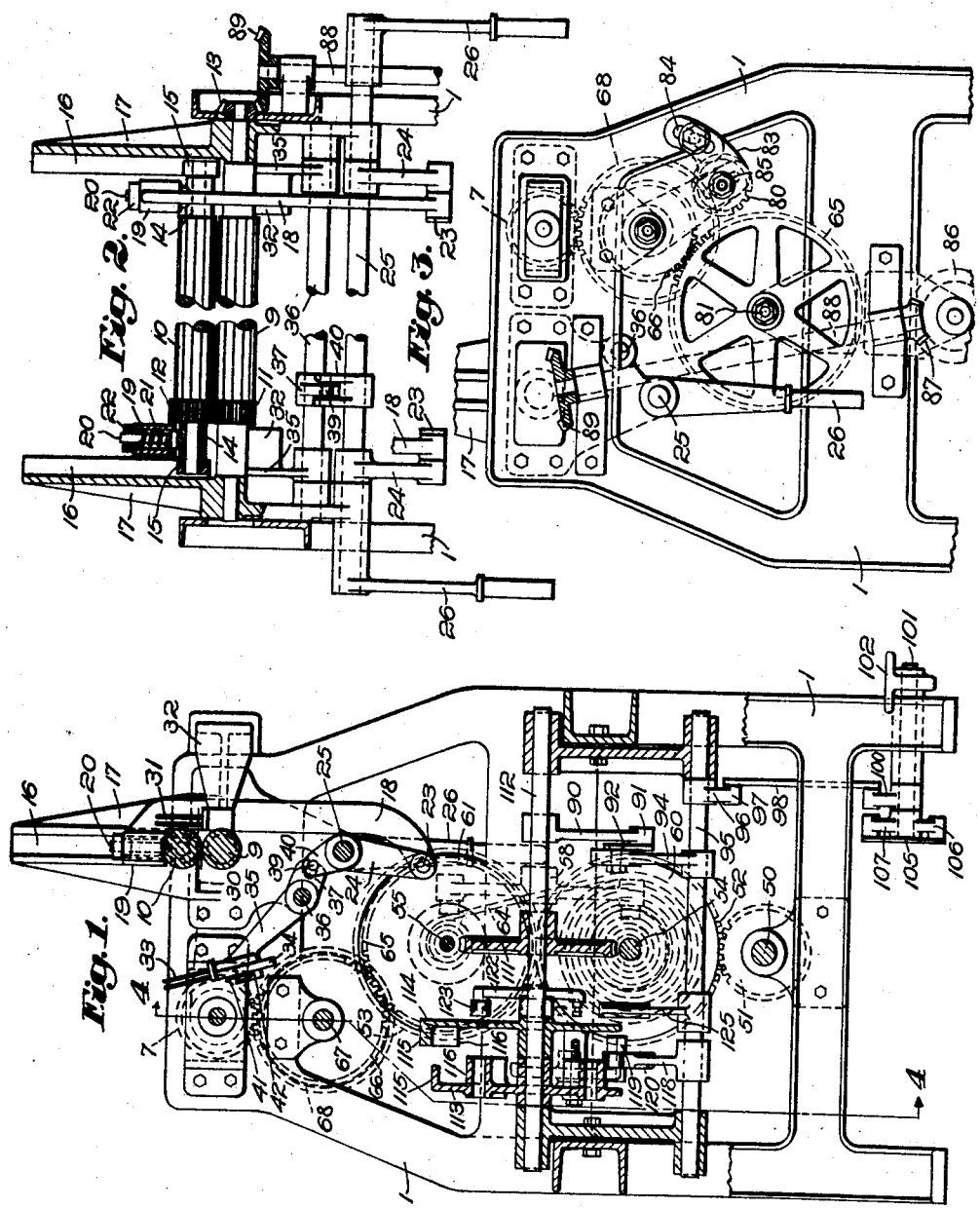
Inventors:
Bicknell Hall
Edgar F. Hathaway
by Emery, Booth, Janney & Varney
Attys April 1, 1930.  B. HALL ET AL  1,752,738
WINDING MECHANISM, PARTICULARLY ADAPTED FOR PATTERN SETTING FRAMES
Filed Nov. 30, 1926  6 Sheets-Sheet 2
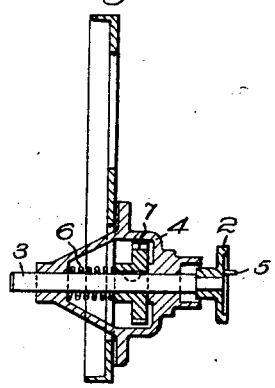
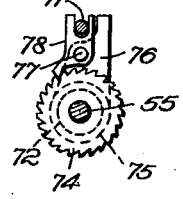
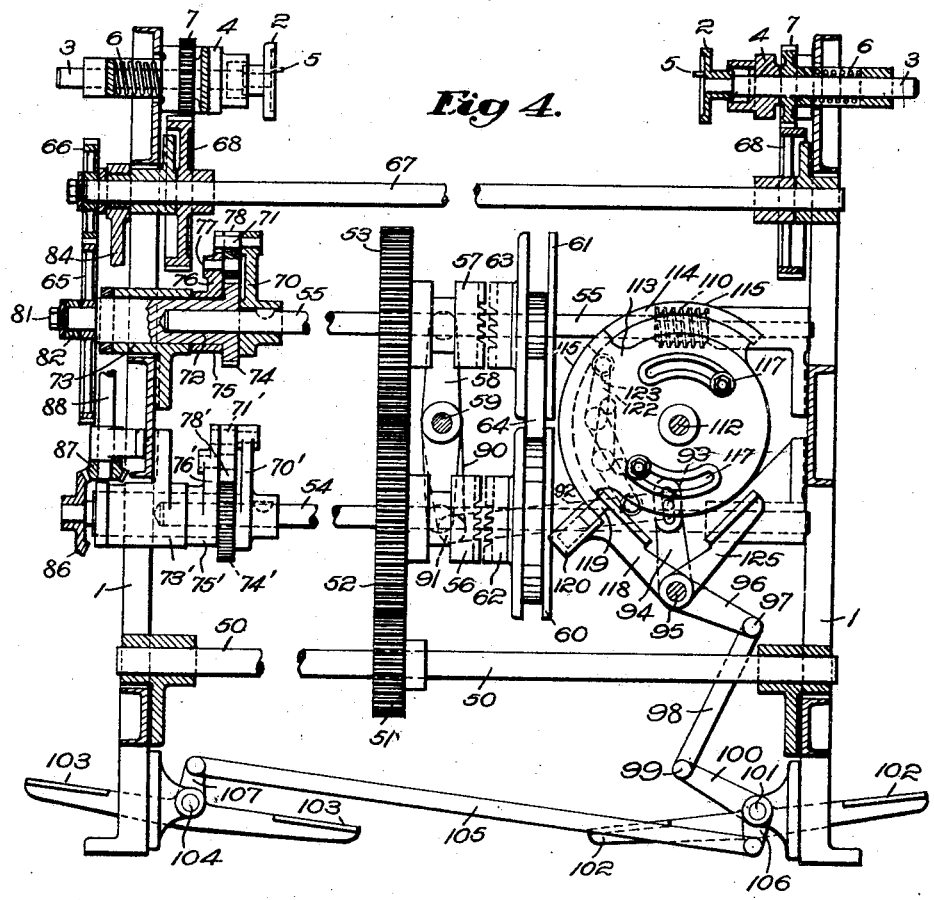
Inventors:
Bicknell Hall
Edgar F. Hathaway
by Emery, Booth, Janney & Varney
Atty's Inventors:
Bicknell Hall
Edgar F. Hathaway
by Emery, Booth, Janney & Varney
Atty's

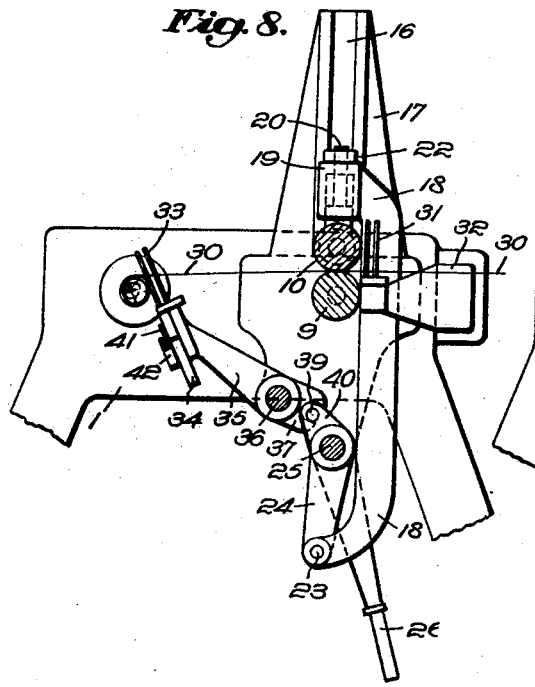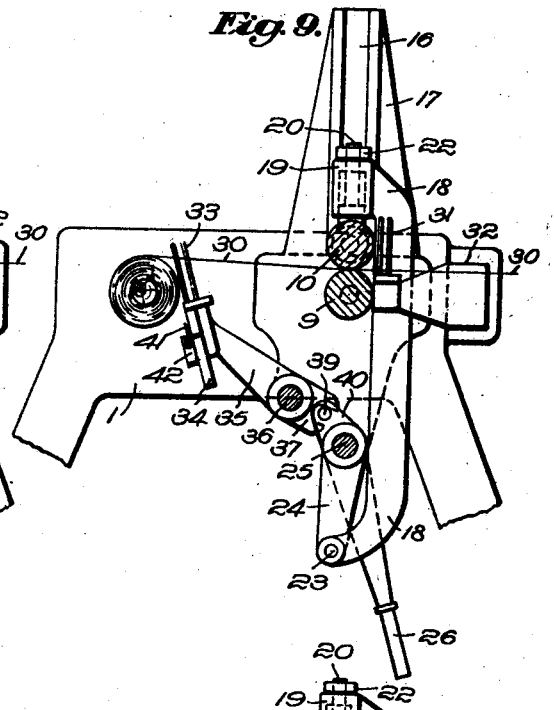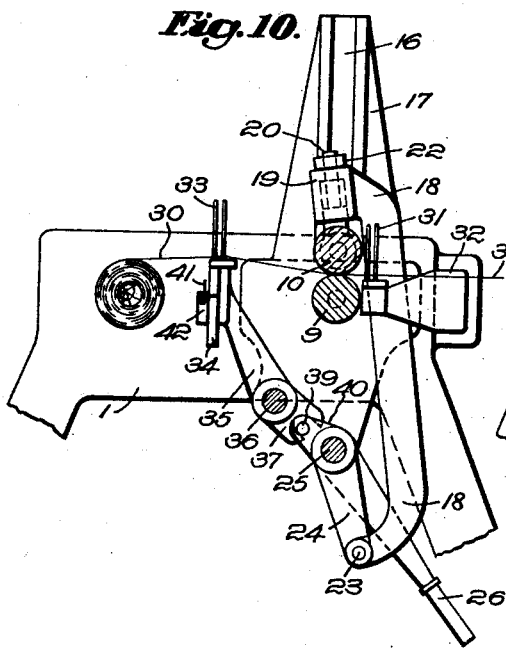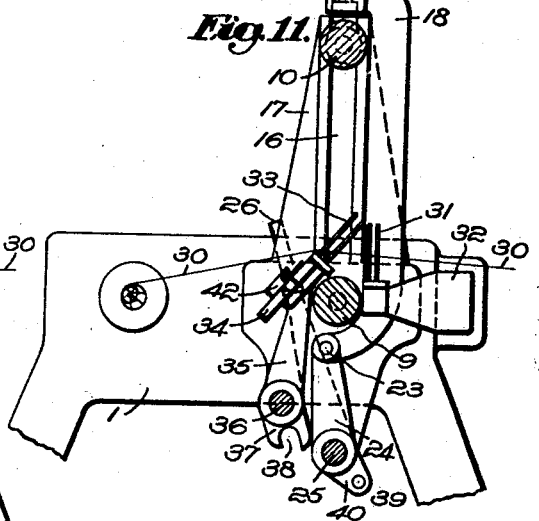

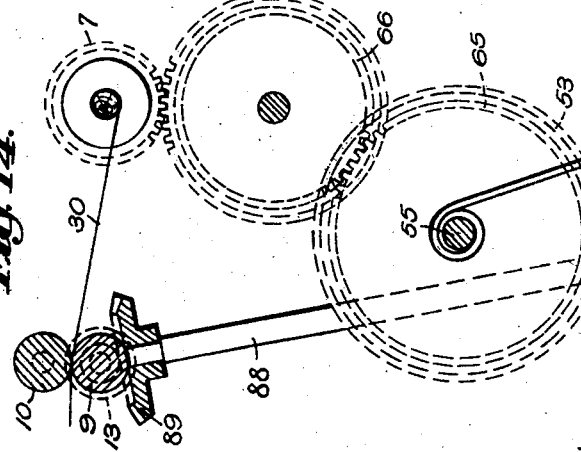

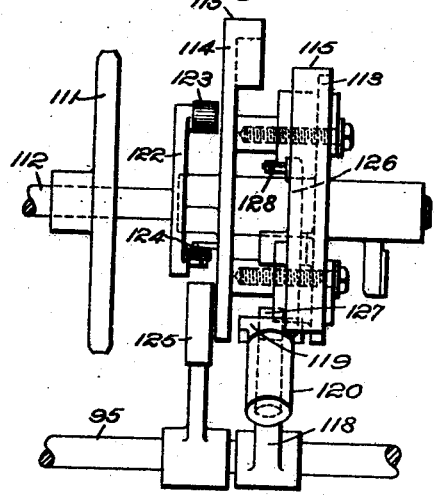
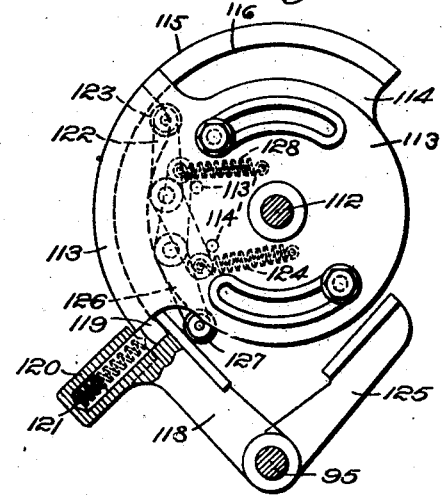
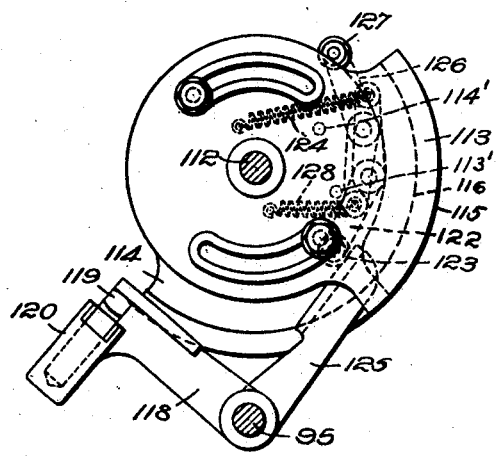
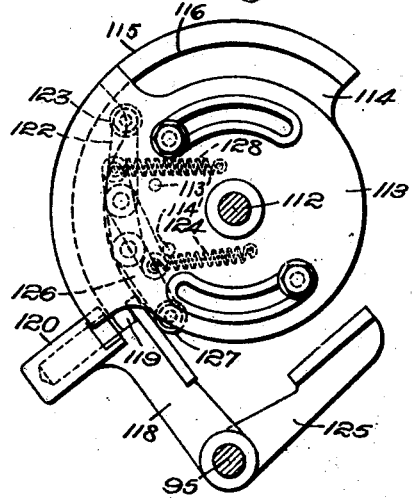

Patented Apr. 1, 1930

1,752,738

UNITED STATES PATENT OFFICE

BICKNELL HALL, OF QUINCY, AND EDGAR F. HATHAWAY, OF WELLESLEY, MASSACHUSETTS, ASSIGNORS TO SHAWMUT ENGINEERING COMPANY, OF DORCHESTER, MASSACHUSETTS, A CORPORATION OF MASSACHUSETTS

WINDING MECHANISM PARTICULARLY ADAPTED FOR PATTERN-SETTING FRAMES

Application filed November 30, 1926. Serial No. 151,662.

Our invention relates to winding mechanism, particularly in connection with so-called pattern setting frames for preparing tuft yarn spools for moquette or other pile fabric looms, and aims to provide an improved mechanism of the class described.

In the drawings illustrating by way of example one embodiment of our invention:—

Fig. 1 is a vertical section, with the extreme lower portion of the figure in end elevation, showing one form of mechanism embodying our invention;

Fig. 2 is a vertical transverse section through the mechanism at the upper portion of Fig. 1, with parts omitted;

Fig. 3 is a partial end elevation of the upper portion of the machine as viewed from the opposite or left side as compared with Fig. 1;

Fig. 4 is a transverse vertical section substantially on the line 4—4 of Fig. 1 with parts omitted for the sake of clearness;

Fig. 5 is a detail view in horizontal section through a portion of the spool holding mechanism;

Figs. 8, 9, 10 and 11 are vertical sectional views corresponding to the upper portion of Fig. 1 but upon a somewhat larger scale, illustrating successive positions of the parts shown;

Figs. 14, 15 and 16 are partially diagrammatic, vertical sections illustrating successive positions of certain portions of the drive mechanism;

Figure 12:
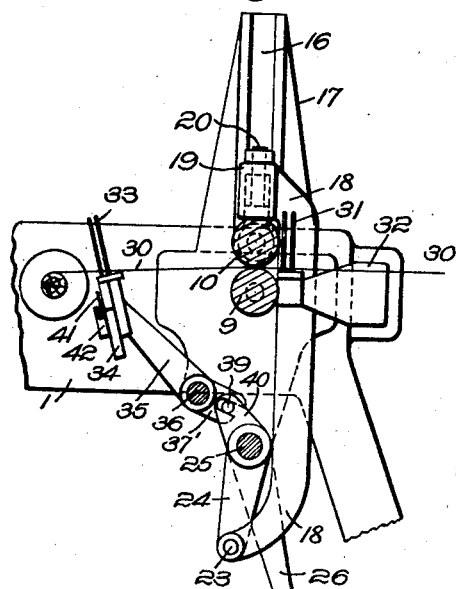
Figs. 12 and 13 are views corresponding respectively to Figs. 8 and 11 and illustrating a modified form of mechanism also embodying our invention.
Figure 6:
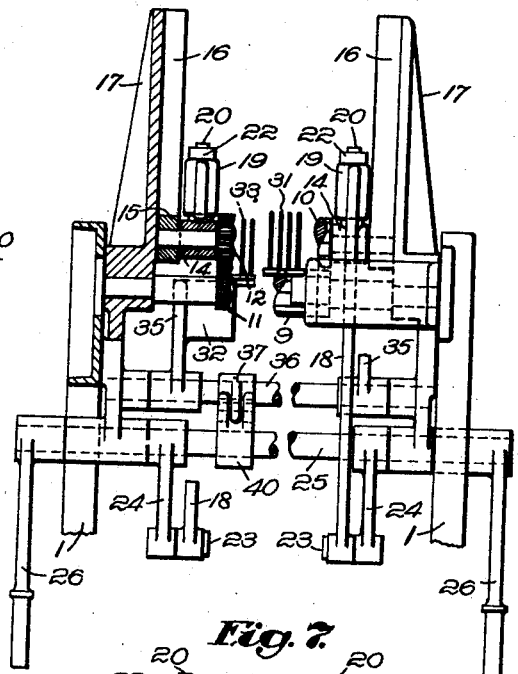
Figs. 6 and 7 are views similar to that of Fig. 2, with parts omitted, and illustrating two positions of the parts.

Fig. 17, found on Sheet 2 with Figs. 4 and 5, in a detail view;

Fig. 18 is an end elevation of certain cam mechanism as viewed from the left in Fig. 4, and upon a somewhat larger scale than in said figure;

Figs. 19, 20 and 21, partly in front elevation and partly in section, show said cam mechanism of Fig. 18, upon the same scale as in said Fig. 18.

Referring more particularly to the drawings, and first to Figs. 1 to 5, the mechanism shown as illustrative of one form of the invention comprises a suitable framing or support, including the side frames 1, 1. The spool upon which the yarns are to be wound is rotatably supported upon the frame, and preferably, and as illustrated, in a manner whereby it may be positively driven and whereby presser rolls heretofore associated with the spool may be dispensed with.

Looking now particularly at the upper portion of Fig. 4, the spool holding mechanism comprises the spool-head cups 2, 2 oppositely positioned and adapted to receive the ends or heads of the spool to be wound. Said cups are carried by spindles 3, 3 rotatably and slidably supported in spaced bearings in the cages 4, 4 upon the adjacent side frames; see also Fig. 5. Each cup has upon its inner face a pin 5 adapted to engage a corresponding recess in the outer face of the respective spool head whereby the spool is positively locked in its holding mechanism and prevented from turning relatively thereto.

The spindle 3 of one or both of the spool head cups is slidable, both spindles being so shown in the present instance, they being normally urged inwardly towards each other into substantially the position shown in Fig. 1 as by means of the coil springs 6, 6. To position a spool, one or the other or both of the cups are pushed outwardly against the pressure of their springs to the extent necessary to admit the spool. Adjustably keyed upon the respective spindles are the gears 7, 7 whereby the spool-head cups and spool may be driven, herein positively. To adapt the spool holding mechanism to spools of different lengths, such, for example, as a 27-inch spool or a 36-inch spool, or others, one or both spindles may be shifted axially in their bearings, toward or away from each other to the extent required, said gears 7, 7 being correspondingly shifted along the spindles, as permitted by said adjustable attachment to their spindles.

The yarns extending from the bobbins in the usual creel (not shown) are preferably fed to the spool, at the desired and predeterminable rate, rather than being merely drawn off from the bobbins by the rotation of the spool as has heretofore been the universal practice so far as we are aware. Accordingly, we have herein illustrated means for drawing off the yarns from the bobbins and positively feeding them to the spool. Referring now to Figs. 3, 4 and 6 to 11, said yarn feeding means herein comprises a plurality of rotary yarn feeding members or rolls including the lower roll 9 and the cooperating upper roll 10. The surfaces of said rolls may be of any suitable character to afford a positive or non-slip feed of the yarns. If metal, the rolls are preferably longitudinally fluted or corrugated, or they may be roughened, or formed of or covered with rubber, or with leather or the like, or otherwise constructed to afford a positive yarn feed by engagement of the yarns between them.

Preferably, and is herein illustrated, said rolls are positively driven, as by means of the meshing gears 11, 12 thereon, one of the rolls, herein the lower roll 9, being fixedly journalled in the adjacent portions of the side frames and having at one of its ends a drive pinion 13. To facilitate the placing of the yarns in setting up the mechanism for operation the rolls are desirably separable, and one roll, herein the upper roll 10 is bodily movable toward and away from the cooperating roll. Said upper roll 10 accordingly is journalled in sleeve bearings 14, 14 having at their outer ends the squared head portions 15, 15 movable in guides 16, 16 in uprights 17, 17 rising from the respective side frames 1, 1.

Connected to each sleeve bearing 14 is a yoke-like roll-shifting lever 18 having at its upper end a collar 19 adapted to surround a stud 20 projecting from the respective sleeve bearing. Surrounding said studs and within the collars 19, 19 are springs 21, 21 each bearing between the base of its stud and a centrally apertured nut 22 threaded on the respective collar. Said parts are thus arranged to permit the collars 19, 19 to move relatively to the studs, against pressure of the springs. Said levers 18, 18 are each pivotally connected at their lower ends, as at 23, to arms 24, 24 on a cross shaft 25 rockable in bearings on the machine frame. Fixed on said cross shaft are the hand levers 26, 26, herein one at each side of the machine, for the convenience of the operator.

Figure 7:
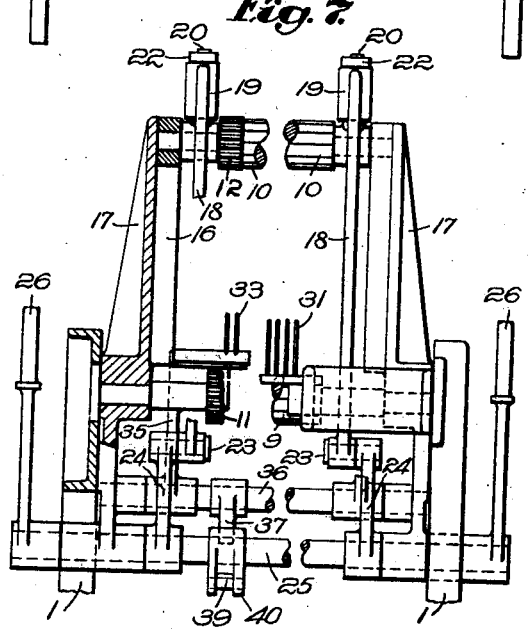

In Figs. 1, 2, 8 and 9 the rolls 9, 10 are shown in their operative position, wherein they are adapted positively to engage and feed the yarns between them. The arms 24, 24 at such time occupy a position "across center" with respect to the axes of the rolls, thus automatically retaining or locking the rolls in the desired relative position. To lift the upper roll, the operator grasps one of the hand levers 26 and moves it to the right in said figures, moving said arms 24, 24 in the same direction, counterclockwise. The roll-shifting levers 18, 18 connected to said arms are at first drawn slightly further downward, until said arms cross the vertical plane containing axes of the rolls 9, 10. This movement of said levers 18, 18 is permitted by the above-described yieldable connections 19, 20, 21, 22 for the upper ends of said levers with the bearings 14, 14 of the upper roll 10. Continued outward movement of a hand lever 26 then carries said levers 18, 18 upwardly, lifting the upper roll 10 into its released position, substantially as shown in Figs. 7 and 11.

Figure 13:
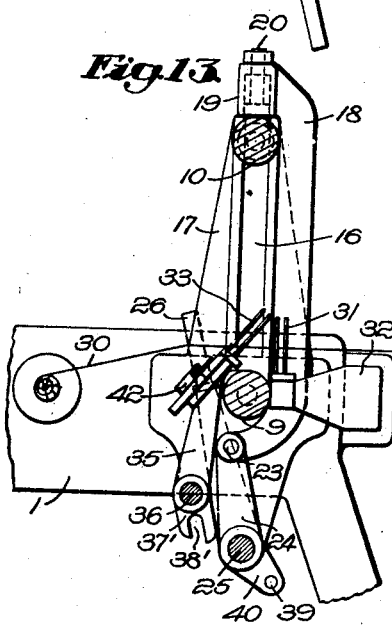

The yarns 30 coming from the bobbins in the creel are desirably passed through suitable spacing and separating or guiding means such as the comb 31, see Figs. 1, 12 and 13, supported at its opposite ends on lugs 32 on the machine side frames. Said comb may be located at any suitable point intermediate the bobbins and the positive feed means 9, 10 but preferably relatively closely adjacent the latter at the infeeding side.

Desirably we also provide additional yarn guiding or spacing means at some point intermediate the feeding means and the spool, and preferably close to the spool or in actual engagement with the yarn package as it builds up on the spool. For this purpose we have provided the second comb 33 carried by a cross bar 34 secured at its opposite ends to arms 35, 35 on a transverse shaft 36 supported for rocking movement in suitable bearings in the side frames and adjacent the cross shaft 25 above mentioned. Said shaft 36 carries a finger 37 having a notch or recess 38 at its upper end in which is adapted to engage a pin 39 on a nose 40 fixed on said cross shaft 25. Through the described connections rocking movement of the cross shaft 25 imparted to it by one or the other of the hand levers 26, 26 will produce a similar but opposite rocking of the second shaft 36, whereby the comb 33 may be moved away from the spool, through the position illustrated in Fig. 10, to its extreme rear position substantially as shown in Fig. 11. In this latter position the two combs 31 and 33 lie close to each other, so that in setting up the mechanism the leading ends of the yarns may be threaded substantially simultaneously through both combs, thus greatly facilitating the setting-up operation. The comb 33 by said construction is also enabled to lie extremely close to or directly upon the spool during the winding operation, but may be moved away from it at other times so as not to interfere with the insertion of a spool into, or removal from, its holders.

In the preferred embodiment, as shown in Figs. 6 to 11, the movable comb 33 is adapted to rest directly upon and in engagement with the building-up yarn package, thus assuring extremely accurate alinement of the individual yarns on the spool and avoiding all overlapping or cross winding of adjoining yarns.

In said figures the recess 38 and finger 37 are so constructed and proportioned as to permit the maximum necessary movement of the comb away from the spool axis in following up with the yarn package as its diameter increases, said recess providing a lost-motion connection for the comb with the nose 40 on the cross shaft 25 and thereby permitting said yielding movement of the comb. If desired, however, the comb 33 may be operatively positioned adjacent the spool but out of engagement with the yarn package, and such arrangement is illustrated in Figs. 12 and 13, wherein the notch 38' in the finger 37' receives the pin 39 substantially without lost-motion and the comb 33 is held approximately in the position as in Fig. 12 during the winding operation, but may be shifted to rearward position of Fig. 13, similarly as in Figs. 6 to 11.

When a spool has been wound with the desired length of yarn, the yarn ends are customarily held in spaced relation by a suitable yarn spacer or clamp adapted for temporary attachment to the spool. At the completion of the spooling operation, such yarn spacer or clamp, illustrated herein at 41 in a clamp-carrier 42 mounted on the cross-bar 34 of the yarn comb 33, may be positioned upon the yarn ends in any preferred manner, manually or automatically, for example, as disclosed in the U. S. Patent to Hathaway and Lea 1,313,294. In some instances, particularly in connection with an underwound spool, as illustrated in Figs. 14 to 16, the end clamp or spacer may be brought into position upon the yarns merely by movement of the cross bar 34, on which the clamp carrier 42 is mounted, away from the spool, as by one of the hand levers 26. After application of the yarn spacer or clamp 41 to the yarns, however effected, the latter may then be severed from the bobbin supply, the yarn end clamp temporarily secured to the spool heads to hold the yarns in their proper relative positions until the spool is required for use in the loom, and the spool removed from the pattern setting frame.

Referring again to Figs. 1 to 4 power for the machine is supplied in any suitable manner, herein to the main drive shaft 50, journalled in the machine frame near its lower portion. Said main drive shaft carries a gear 51 meshing with one of a pair of relatively large intermeshing gears 52, 53 loose upon the countershafts 54 and 55 respectively, as best seen in Fig. 4 and also in Fig. 1. Each of said gears 52, 53 has on one face, the right in Fig. 4, the movable element, 56 and 57 respectively, of a pair of clutches. Said clutch elements are slidable on the countershafts 54 and 55 with their respective gears, the latter being sufficiently wide to permit them to remain in mesh. Said clutch elements and gears are connected for simultaneous sliding movement in opposite directions, as by means of a two-arm clutch operating lever 58 engaging the respective clutch elements 56, 57 at its opposite ends, and carried on a longitudinal shaft 59 rockably supported upon the machine framing.

On each of the countershafts 54, 55 is fixed a drum or barrel 60 and 61 which together comprise a portion of a fusee-like operating connection between the countershafts, for driving one from the other at progressively varying speeds. Said drums carry upon their faces toward the gears 52, 53 the clutch elements 62 and 63, whereby one or the other of the drums may be drivingly connected with the main shaft 50.

Connecting said drums is an elongated flexible member 64 which may be a belt, cord, chain or other flexible device adapted to be wound from one drum onto the other, and attached at its opposite ends to the barrels of the respective drums. Prior to the start of a winding operation the flexible member 64 is wound upon one of the drums, herein the lower drum 60. The clutch lever 58 is then moved to throw the clutch from the neutral position as shown in Fig. 4 and to throw in the upper clutch 57, 63. The drive is then from the main shaft 50 and gear 51 through the gears 52, 53 to the upper drum 61, keyed on and consequently rotating the upper countershaft 55.

Successive positions of the fusee device, that is, the drums and member 64, are illustrated in Figs. 14 to 16, Fig. 14 showing the position at the start of a spool winding operation. As the upper drum rotates the flexible member 64 is drawn off from the lower drum and wound up on said upper drum, an intermediate stage being shown in Fig. 15, and in Fig. 16 the condition substantially at the completion of the winding of a spool. Said flexible member, which as stated, may be a link chain, cord, belt or the like, in the form shown is wound onto itself on the drum, forming a coil of increasing diameter and whereby the lower drum and its countershaft 54 is driven at a proportionately increasing rate of speed. Obviously the drums may be otherwise formed or other provision made for a progressive increase of speed transmission from one countershaft to the other.

As illustrated, the lower countershaft 54 is thus driven at a variable and herein increasing rate of speed, and through suitable connections serves to operate the yarn feeding means, while the upper countershaft 55, herein driven at a constant rate, is operatively connected with the yarn spool.

Considering first the spool driving connections, and referring particularly to Fig. 4, the upper countershaft 55 is connected, preferably through suitable one-way drive mechanism, with a gear 65, seen at the left in Fig. 4, and meshing with a gear 66 on the spool gear shaft 67 journalled in the machine side frames. On said spool gear shaft are the spool gears 68, 68 respectively meshing with the gears 7, 7 on the spool-cup spindles 3, 3 previously described, said spool gears being sufficiently broad to permit the necessary axial shifting of the gears 7, 7 when inserting a spool for winding, or removing it after winding.

Said one-way drive between the countershaft 54 and gear 65 may be of any suitable construction but we have devised for this purpose the novel silent ratchet means illustrated. As best seen in Fig. 4, and also in Fig. 17, said ratchet device comprises a radial arm 70 keyed on the countershaft 55 and having near its outer end a pin 71. The gear 65 is attached to an elongated sleeve 72 journalled in a box 73 on the adjacent side frame and having at its inner end a ratchet wheel 74. Intermediate said ratchet wheel and said box 73 is a collar 75 loose on the sleeve 72 and having a radially projecting finger 76 on which is a stud 77 carrying a pivoted dog 78. Said dog is of substantially the form shown in Fig. 17, being U-shaped or recessed to receive said pin 71 on the arm 70 secured to the countershaft.

In operation, rotation of the countershaft in a counter-clockwise direction, viewing Fig. 17, carries the pin 71 in the same direction and forces the dog 78 into engagement with a tooth of the ratchet 74, thereby driving the sleeve 72 and consequently the gear 65 connected to it. If the countershaft is rotated in the opposite or clockwise direction, however, the pin 71 lifts the dog wholly out of engagement with the ratchet, thus disconnecting the sleeve 72 from the countershaft journalled in it. The arm 70 and pin 71 rotate with the shaft but transmit no action to the ratchet wheel. Since the dog is out of contact with the ratchet wheel at such time, the device is silent in operation.

Desirably provision is made for reversing the direction of rotation of the spool to permit the yarns to be underwound, as shown in Figs. 14 to 16, or overwound on the spool, as shown in the remaining figures, as may be desired, such possible selective underwinding or overwinding of a spool being sometimes required in order to afford the proper pattern arrangement of the yarns. Accordingly we have provided an idler or reverse pinion 80, see Fig. 3, adapted for movement into or out of engagement with the gears 65, 66 being sufficiently broad to engage both of the latter. The gear 65 is shifted axially out of mesh with the gear 66 during such reverse driving, said shifting being readily accomplished by removing the nut 81 and placing the collar 82 to the inside of the hub of the gear 65, instead of at its outside, as shown in Fig. 4. The reverse pinion 80 is carried by an elbow bracket 83 loosely supported at one end upon the spool gear shaft 67, and at its opposite end having a slot and bolt connection 84 with the adjacent side frame 1. Said pinion is adjustably journalled on said bracket, as at 85, said adjustment providing for proper meshing of the pinion with the upper gear 66, while the slotted connection 84 affords adjustment relative to the lower gear 65.

Turning now to the operating connections for the yarn feeding means, as seen at the left in Fig. 4 and also in Fig. 3, the lower countershaft 54 is connected, preferably through a one-way drive device or ratchet mechanism, with a bevel gear 86 meshing with a pinion 87 at the lower end of a substantially vertical shaft 88 having bearings on the machine frame. Said shaft 88 has at its upper end a bevel pinion 89 which meshes with the feed roll drive pinion 13 previously described; see Fig. 3, and Figs. 14 to 16. The one-way drive between said countershaft 54 and bevel gear 86 may be, and is herein illustrated, as a silent ratchet device similar to that intermediate the upper countershaft 55 and the gear 65, the parts of said ratchet device being indicated by the same reference numerals as in the first instance, with the addition of prime marks.

Through the above described means the spool is positively rotated at a given speed and the yarn feeding mechanism will be operated at a variable speed increasing exactly in proportion as the diameter of the yarn package winding onto the spool increases. The gearing and associated parts are so proportioned and arranged that the maximum number of turns of the spool necessary may be obtained during the complete passage of the flexible member 64 from one drum onto the other. Obviously the gearing ratio for the spool may be varied as desired, herein merely by substituting different sized gears for the gear 65 or 66 or both, the reverse pinion 80 being supported for cooperation with different sized gears, as described.

When a spool has been filled with yarn the flexible member or fusee chain 64 is rewound onto its original drum, such rewinding herein being accomplished by reversing the two clutches, throwing out the upper clutch 57, 63 and engaging the lower clutch 56, 62. The lower drum 60 is then driven directly from the gear 52 and in a direction opposite to that in which it was previously rotated by the winding up of the flexible member onto the upper drum 61. Due to the provision of ratchet mechanisms intermediate the two countershafts and the gearing normally driven by them, the spool driving mechanism and its gear train and also the feeding mechanism and its gear train herein remain at rest during said rewinding of the fusee device.

Desirably we provide means for starting the mechanism and thereafter stopping it when the desired and predetermined length of yarn has been wound onto the spool, and also for initiating the rewinding of the fusee device, preferably all automatically but under the immediate control of the operator. As best seen in Fig. 4, and also in Fig. 1, the shaft 59 for the clutch operating lever 58 has connected to it a lever 90 pivoted at 91 to one end of a link 92, the other end of which has a pin-and-slot connection, as at 93, with an arm 94 projecting from a control shaft 95 parallel with said shaft 59; see also Fig. 1. Fixed on said control shaft is a downwardly projecting finger 96 pivoted at 97 to the upper end of a link 98 in turn pivotally connected at 99 to an arm 100 secured to the bottom shaft 101, parallel with said shafts 59 and 95, and mounted for rocking movement in brackets on the adjacent side frame.

For rocking said shaft are provided the oppositely extending foot levers 102, 102 positioned conveniently for access by the operator. Desirably a similar pair of foot levers 103, 103 is provided at the opposite side of the machine, on a shaft 104 similar to the bottom shaft 101, said shafts 101 and 104 being interconnected for simultaneous operation as by the cross link 105 pivoted at its ends to oppositely projecting lugs 106, 107 on the respective shafts.

As shown in Fig. 4 the two clutches 56, 62 and 57, 63 are in neutral position, both being disengaged. If now the outer foot lever of the set at either side of the machine be depressed it will be seen that the depending finger 96 on the control shaft 95 will be moved upwardly, rocking said shaft in a counterclockwise direction and, through the described connections, turning the clutch shaft 59 in a similar direction, to throw in the upper clutch. The two trains of gear connections extending respectively to the spool and to the yarn feed are thus set in motion.

Associated with said clutch operating mechanism is the means for automatically determining the operating period, and accordingly the number of rotations of the spool and the length of yarns wound on, whereby the machine may be automatically stopped when the desired quantity of yarn has been supplied to the spool, the fusee device being then rewound. While this may be accomplished through any suitable mechanism, herein for the purpose we have illustrated a type of variable cam control.

Referring to Fig. 4, near the right end of the upper countershaft 55, is a worm 110 meshing with a worm gear 111 on a cam shaft 112 journalled in the machine framing and extending from front to rear that is, parallel with the shafts 59 and 95 previously described; see also Fig. 1. When the upper clutch 57, 63 is thrown in said cam shaft is rotated, but at a materially reduced speed as compared with that of the countershaft 55. On said cam shaft is fixed a variable or two-part cam device comprising the cam members 113 and 114 each having an outer peripheral cam surface 115 and an inner cam surface 116. Said two cam parts are angularly adjustable relatively to each other as by means of the arcuate slot-and-bolt connections 117, 117 whereby the effective length of the cam surfaces may be varied; see also Figs. 18 to 21.

Extending from the control shaft 95 previously mentioned is the cam lever 118 carrying at its outer end the cam follower 119, seen in Figs. 1 and 4, and in said Figs. 18 to 21 and formed as a bar of a length to extend across both cam parts for coaction with the cam surfaces on each of them. Said cam follower is roughly T-shaped and is yieldably connected to said cam lever, having a stem portion slidable in a housing 120 thereon, the follower being normally pressed outwardly by a spring 121 in said housing.

In Fig. 4, as also in Fig. 19, the cam follower 119 is in its neutral position, against one end face of the cam portion 113, the machine being at rest. When the proper foot lever at either side of the machine is depressed to start the machine, the rocking of the control shaft 95 moves the cam lever 118 and follower outwardly and downwardly, so that the follower will ride on the outer cam surface 115 of the two-part cam the latter moving in a counterclockwise direction, as viewed in said figures. When the two-part cam has turned sufficiently to carry its entire operative outer surface past the follower, to the position shown in Fig. 20, said follower will be thrown inwardly through its neutral position, and into a position where it will ride on the inner cam surface 116. This shifting of the follower and the cam lever 118 effects a reversal of the clutches, with resultant reverse drive of the cam shaft 112. The two-part cam is accordingly turned in a reverse direction, with the cam follower 119 riding on the inner cam surface 116.

Said inward shifting movement of the cam lever 118 is herein effected by means of a double-arm lever 122 pivotally supported on the cam shaft and provided with a roller 123 at its outer end, and at its opposite end secured to one end of a coil spring 124, the other end of which is suitably anchored. As the cam travels from the position shown in Fig. 19 to that of Fig. 20 said roller engages a finger 125 in its path and secured to the control shaft 95. Said finger forces the roller and the arm of the double lever which carries it inwardly, tensioning the spring 124 and setting it to throw the cam lever 118 inwardly immediately it is permitted to do so by reason of the cam follower 119 riding off from the outer cam surface 115. As shown in Fig. 20 the follower and cam lever are just about to be shifted inwardly in the manner described.

At the end of the reverse or fusee-rewinding operation, which position is illustrated in Fig. 21, the cam lever 118 will again be shifted, now outwardly, but only to its intermediate or neutral position bringing the machine to rest. Said outward shifting is effected by a double-arm lever 126 having a roller 127 and a spring 128, similar respectively to the parts numbered 122 to 124 and carried on the cam part 113 in position to contact the cam lever 118. Suitable stops 113', 114' are provided to control the operation of said double-arm spring levers and to insure the accurate return of the cam lever 118 to neutral position, such, for example, as indicated by the small dotted line circles adjacent said spring levers on Figs. 19 to 21.

The machine is thus automatic in its operation, and is effective to supply and wind onto the spool with great accuracy the precise length of yarn which may be required and which may be predetermined in accordance with the particular requirements. The attendant, however, may stop the machine at any point in the sequence of operations should he desire to do so for any reason, such as the breakage or failure of a yarn, or other irregularity. Such stopping of the machine may be effected merely by depressing the proper foot lever at either side of the machine, bringing the clutches to neutral position. This may be done even though the cam follower 119 is then riding on a cam surface, owing to the yieldable connections 120, 121 between said follower and the cam lever 118. Subsequent release or reverse movement of the depressed foot lever will again put the machine in operation, beginning at the exact point in the operating cycle at which it left off, the operation automatically resuming and continuing as if uninterrupted.

It will be understood that in accordance with the apparatus and method of our invention, including the positive driving of the spool and the positive yarn feed, with the provision for relative variation in the rate of rotation of the spool and the rate of yarn feed, the yarns are maintained under substantially uniform tension during the winding process. Such relative variation may be effected in any desired manner, as by increasing the rate of feed, as herein illustrated by way of example. There results a uniformity in the formation of the yarn package on the spool, while, as previously stated, a predeterminable length of yarn is wound with extreme accuracy, so that the quantity of yarn of a given character on successive spools may be relied upon as substantially identical.

Our invention is not limited to the illustrative embodiments or methods herein shown and/or described, its scope being recited in the following claims:

Claims:

1. Winding mechanism particularly for pattern setting frames comprising, in combination, a rotatable support for a spool, a plurality of rotary members for feeding the yarn or yarns to the spool, a power-receiving element, and gearing connections between said element and the spool support, and between said element and the yarn feeding members, said last connections including automatic means whereby the rate of feed of said feeding members is increased as the spool is rotated.

2. Winding mechanism particularly for pattern setting frames comprising, in combination, a rotatable support for a spool, a plurality of rotary members for feeding the yarn or yarns to the spool, a power-receiving element, gearing connections between said element and the spool support, and between said element and the yarn feeding members, said last connections including automatic means whereby the rate of feed of said feeding members is increased as the spool is rotated, and control means to interrupt said gearing connections after a predetermined operating period.

3. Winding mechanism particularly for pattern setting frames comprising, in combination, means rotatably to support a spool to be wound, gear means to rotate the spool, yarn feeding means, gear means to drive the latter, speed varying means operatively associated with one of said gear means to vary the rate of spool rotation and of yarn feed relatively to each other as the spool fills with yarn, and means automatically to stop the mechanism when a predetermined quantity of yarn has been spooled.

4. Winding mechanism particularly for pattern setting frames comprising, in combination, means rotatably to support a spool to be wound, gear means to rotate the spool, yarn feeding means, gear means to drive the latter and speed varying means operatively associated with one of said gear means to vary the rate of spool rotation and of yarn feed relatively to each other as the spool fills with yarn.

5. Winding mechanism particularly for pattern setting frames comprising, in combination, means rotatably to support a spool to be wound, gear means to rotate the spool, yarn feeding means, gear means to drive the latter, and progressive speed varying means for one of said gear means whereby the yarn is presented to the spool by said feeding means under substantially uniform tension during the spooling operation irrespective of the increasing diameter of the yarn package on the spool.

6. Winding mechanism particularly for pattern setting frames comprising, in combination, means rotatably to support a spool to be wound, gear means to rotate the spool, yarn feeding means, gear means to drive the latter, means whereby the yarn is presented to the spool by said feeding means under substantially uniform tension during the spooling operation irrespective of the increasing diameter of the yarn package on the spool and means automatically to stop the mechanism when a predetermined quantity of yarn has been spooled.

7. Winding mechanism particularly for pattern setting frames comprising, in combination, means rotatably to support a spool to be wound, gear means to rotate the spool, yarn feeding means, gear means to drive the latter, speed varying means operatively associated with one of said gear means to vary the rate of spool rotation and of yarn feed relatively to each other as the spool fills with yarn, and variable cam means to determine the operating period.

8. Winding mechanism particularly for pattern setting frames comprising, in combination, means rotatably to support a spool to be wound, gear means to rotate the spool, yarn feeding means, gear means to drive the latter, means whereby the yarn is presented to the spool by said feeding means under substantially uniform tension during the spooling operation irrespective of the increasing diameter of the yarn package spool, and variable cam means to determine the operating period.

9. Winding mechanism for tuft-yarn spools of Axminster looms comprising, in combination with means for rotatably supporting a spool, yarn feeding means, a power-receiving element, positive gearing connections between said element and the spool supporting means, and operating connections between said element and the yarn feeding means, said connections including mechanism whereby the rate of yarn feed is progressively increased during rotation of the spool.

10. Winding mechanism for tuft-yarn spools of Axminster looms comprising in combination with means for rotatably supporting a spool, yarn feeding means, a power receiving element, positive gearing connections between said element and the spool supporting means, and operating connections between said element and the yarn feeding means.

11. Winding mechanism for tuft-yarn spools of Axminster looms comprising, in combination, means to support and positively to rotate a spool, yarn feeding means, and operating mechanism therefor adapted to vary the rate of yarn feed and the rate of spool rotation relatively to each other during the winding operation.

12. In mechanism of the class described, in combination with means rotatably to support a spool, positive yarn feeding means, and drive connections for both said means, a power-receiving element, a clutch intermediate said element and said drive connections, means for engaging said clutch to start rotation of the spool and operation of said feeding means, and automatic means to disengage said clutch when a predetermined length of yarn has been wound.

13. In mechanism of the class described, in combination with means rotatably to support a spool, positive yarn feeding means and drive connections for both said means, a power-receiving element, a clutch intermediate said element and said drive connections, means for engaging said clutch to start rotation of the spool and operation of said feeding means, and automatic means to disengage said clutch when a predetermined length of yarn has been wound, said means for engaging the clutch being also reversely operable at will to disengage the clutch independently of said automatic means whereby, upon subsequent engagement of the clutch, said automatic means will resume its functions as if uninterrupted.

14. In mechanism of the class described, in combination with means rotatably to support a spool, positive yarn feeding means and drive connections for both said means, a power-receiving element, a clutch intermediate said element and said drive connections, means for engaging said clutch to start rotation of the spool and operation of said feeding means, and variable cam means to disengage said clutch when a predetermined length of yarn has been wound, said means for engaging the clutch being also reversely operable at will to disengage the clutch independently of said variable cam means.

15. In winding mechanism, in combination with a spool support and rotary yarn-feeding means, a main shaft, two countershafts, each having loose thereon one of a pair of meshing gears, a gear on said main shaft engaging one of said gears, one-way drive connections between one countershaft and the spool support, and between the other countershaft and the yarn feeding means, a drum fixed on each countershaft, means drivingly to connect or disconnect each of said pair of gears and its respective shaft, one gear being connected and the other disconnected during the spool winding operation, and a flexible element connecting said drums and adapted to be wound from one by and onto the other thereby to drive one countershaft from the other at a progressively varying speed.

16. In winding mechanism, in combination with a spool support and rotary yarn-feeding means, a main shaft, two countershafts, each having loose thereon one of a pair of meshing gears, a gear on said main shaft engaging one of said gears, one-way drive connections between one countershaft and the spool support, and between the other countershaft and the yarn feeding means, a drum fixed on each countershaft, means drivingly to connect or disconnect each of said pair of gears and its respective shaft, one gear being connected and the other disconnected during the spool winding operation, a flexible element connecting said drums and adapted to be wound from one by and onto the other thereby to drive one countershaft from the other at a progressively varying speed, and automatic means to disconnect said connected gear to terminate the winding operation.

17. In winding mechanism, in combination with a spool support and rotary yarn-feeding means, a main shaft, two countershafts, each having loose thereon one of a pair of meshing gears, a gear on said main shaft engaging one of said gears, one-way drive connections between one countershaft and the spool support, and between the other countershaft and the yarn feeding means, a drum fixed on each countershaft, means drivingly to connect or disconnect each of said pair of gears and its respective shaft, one gear being connected and the other disconnected during the spool winding operation, a flexible element connecting said drums and adapted to be wound from one by and onto the other thereby to drive one countershaft from the other at a progressively varying speed, and means to disconnect said connected gear at the end of the spooling operation and to connect said other gear to effect the rewinding of said flexible element onto the drum originally holding it.

18. In pattern setting mechanism, in combination with a spool upon which a set of yarns is to be wound, means to support and positively to rotate the spool, means to feed the yarn to the spool, means to vary the rate of yarn feed and the rate of spool rotation relatively to each other to compensate for the increasing diameter of the yarn body on the spool, and means automatically to stop the mechanism when a predetermined quantity of yarn has been spooled.

19. In pattern setting mechanism, in combination with a spool upon which a set of yarns is to be wound, means to support and positively to rotate the spool, means to feed the yarn to the spool, means to vary the rate of yarn feed and the rate of spool rotation relatively to each other to maintain a substantially constant tension on the yarns, and means to stop the mechanism when a predetermined length of yarn has been wound.

20. In pattern setting mechanism, in combination with a spool upon which a set of yarns is to be wound, means to support and positively to rotate the spool, means to feed the yarn to the spool, and means to vary the rate of yarn feed and the rate of spool rotation relatively to each other to compensate for the increasing diameter of the yarn body on the spool and to maintain a substantially constant tension on the yarns.

21. In pattern setting mechanism, in combination with a spool to hold a set of yarns, means to support and positively to rotate the spool to wind on the yarns, yarn feeding means, means to increase the rate of yarn feed to compensate for the increasing diameter of the yarn package on the spool, and means to stop the mechanism when a predetermined length of yarn has been wound.

22. In pattern setting mechanism, in combination with a spool to hold a set of yarns, means to support and positively to rotate the spool to wind on the yarns, yarn feeding means, means to increase the rate of yarn feed to compensate for the increasing diameter of the yarn package on the spool, and adjustable means automatically to determine the operating period.

23. In pattern setting mechanism, in combination with a spool to hold a set of yarns, means to support and positively to rotate the spool to wind on the yarns, yarn feeding means, and means to increase the rate of yarn feed to compensate for the increasing diameter of the yarn package on the spool.

24. In a pattern setting machine, a power-receiving element, means rotatably to support a spool, spool rotating means, rotary means for feeding the yarns, and driving connections between said element, said spool rotating means, and said feeding means, said connections including a fusee-like device whereby the rate of feed of said feeding means is increased proportionately to the increase in diameter of the yarn body forming on the spool.

25. In a pattern setting machine, a power-receiving element, means rotatably to support a spool, positive spool rotating means, rotary means for feeding the yarns, and driving connections between said element, said spool rotating means, and said feeding means, said connections including means whereby the rate of yarn feed is varied during the spooling operation to maintain a substantially uniform tension on the yarns.

26. In a pattern setting machine, a power-receiving element, means rotatably to support a spool, positive spool rotating means, rotary means for feeding the yarns, driving connections between said element, said spool rotating means, and said feeding means, and automatic means to disconnect said driving connections after a predetermined operating period.

27. In a pattern setting machine, a power-receiving element, means rotatably to support a spool, spool rotating means, rotary means for feeding the yarns, driving connections between said element, said spool rotating means, and said feeding means, said connections including a fusee-like device whereby the rate of feed of said feeding means is increased proportionately to the increase in diameter of the yarn body forming on the spool, and automatic means operative after a predetermined operating period to disconnect said driving connections and to reset said fusee-like device for a succeeding spooling operation.

28. In a pattern setting machine, a power-receiving element, means rotatably to support a spool, positive spool rotating means, rotary means for feeding the yarns, driving connections between said element, said spool rotating means, and said feeding means, and mechanism variably and automatically to determine the operating period of the machine.

29. In a pattern setting machine, a power-receiving element, means rotatably to support a spool, positive spool rotating means, rotary means for feeding the yarns, driving connections between said element, said spool rotating means, and said feeding means, and adjustable means to stop the machine when a predetermined length of yarn has been spooled.

30. In a pattern setting frame, means rotatably to support a spool, positive spool rotating mechanism and means continuously to feed the yarns to the spool under a substantially uniform tension.

31. In a pattern setting frame, means rotatably to support a spool, positive spool rotating mechanism, means to feed yarns to the spool for winding thereon, and means whereby the tension on the winding-on yarns is maintained substantially uniform throughout the spooling operation.

32. In a pattern setting frame, means rotatably to support a spool, means to feed the yarns thereto for overwinding or underwinding, and mechanism operable selectively to rotate the spool in one or the opposite direction respectively to overwind or underwind the yarns.

33. That method of spooling the tuft yarns for moquette or other pile fabric looms which comprises positively rotating the spool to be wound, drawing out the yarns from their supply and feeding them to the spool, and varying the rate of spool rotation and of yarn feed relatively to each other to maintain a substantially uniform tension on the yarns passing to the spool.

34. That method of spooling the tuft yarns for moquette or other pile fabric looms which comprises positively rotating the spool to be wound, feeding the yarns from their supply to the spool, and controlling the tension on the feeding yarns.

35. That method of spooling the tuft yarns for moquette or other pile fabric looms which comprises positively rotating the spool to be wound, feeding the yarns from their supply to the spool, and maintaining a substantially uniform tension on the yarns during the spooling operation.

36. That method of spooling the tuft yarns for moquette or other pile fabric looms which comprises positively rotating the spool to be wound, feeding the yarns from their supply to the spool, and compensating for the increasing diameter of the body of yarn on the spool, and the otherwise increasing tension on the yarns, by varying the rates of spool rotation and yarn feed relatively to each other and proportionately to said increasing diameter.

37. In winding mechanism for the tuft yarn spools of moquette and like pile fabric looms, in combination with means for rotatably supporting a spool, means for positively rotating the latter, a plurality of rotary members adapted positively to engage and to feed the yarns between them to said spool, and means for driving said members.

38. In winding mechanism for the tuft yarn spools of moquette and like pile fabric looms, in combination with means for rotatably supporting a spool, means for positively rotating the latter, a plurality of fluted rolls adapted positively to engage and feed the yarns between them to said spool and means for rotating said rolls, one of said rolls being mounted for movement into and out of its feeding position to facilitate the initial setting up of the yarns to be wound.

39. In a pattern setting frame, in combination with means rotatably to support a spool, a plurality of rotary yarn feeding members adapted to engage and feed the yarns to the spool, a main drive shaft and positive gearing connections to rotate the spool, and means to rotate said feeding members.

40. In a pattern setting frame, in combination with means rotatably to support a spool, a plurality of rotary yarn feeding members adapted to engage and feed the yarns to the spool, means to drive said feeding members, guide means at the in-feeding side of said members to distribute the yarns along them, and other yarn guiding means adjacent the spool.

41. In mechanism of the class described, means for feeding the yarns from the supply to the spool, comprising a plurality of rolls adapted to engage and feed the yarns between them, means supporting one roll for bodily shifting into and out of feeding position, a hand lever, and operating connections between said hand lever and said roll, for shifting the latter.

42. In mechanism of the class described, means for feeding the yarns from the supply to the spool, comprising a plurality of rolls adapted to engage and feed the yarns between them, means supporting one roll for bodily shifting into and out of feeding position, a hand lever, and operating connections between said hand lever and said roll, for shifting the latter, said connections including a lever having, in the feeding position of the roll, a position "cross center" with respect thereto whereby the roll is automatically retained in yarn-feeding position.

43. In a pattern setting machine, means rotatably to support a spool to be wound, positive spool rotating mechanism, and means positioned by the wound on yarn mass to guide the yarns substantially at the point at which they enter that mass.

44. In a pattern setting machine, means rotatably to support a spool to be wound, spool rotating mechanism, a yarn feeding means, a yarn guide at the in-feeding side of said feeding means, a second yarn guide intermediate said feeding means and the spool, and means to bring said guides into proximity to facilitate the insertion of the yarns therein.

45. In a pattern setting machine, means rotatably to support a spool to be wound, spool rotating mechanism, rotary yarn feeding members, and a yarn guide intermediate said feeding members and the spool and spaced from said feeding members in its normal yarn-guiding position, said guide being supported for movement from said normal position to a setting-up position adjacent said feeding members.

46. In a pattern setting machine, means rotatably to support a spool to be wound, spool rotating mechanism, separable rotary yarn feeding members and a yarn guide intermediate said feeding members and the spool, spaced from said feeding members in its normal yarn-guiding position, said guide being supported for movement from said normal position to a setting-up position adjacent said feeding members, and means whereby the operator may separate said feeding members and move said guide to said setting-up position.

47. In a pattern setting machine, means rotatably to support a spool to be wound, spool rotating mechanism, separable rotary yarn feeding members and a yarn guide intermediate said feeding members and the spool, spaced from said feeding members in its normal yarn-guiding position, said guide being supported for movement from said normal position to a setting-up position adjacent said feeding members, means whereby the operator may separate said feeding members and move said guide to said setting up position, and other yarn guiding means at the in-feeding side of said feeding-members, said first yarn guide when in said setting-up position being also brought into close relation with said other yarn-guiding means.

48. In mechanism of the class described, in combination, a machine framing, a spool support thereon, a plurality of rotary yarn-feeding members, said members being supported for relative bodily movement from yarn feeding position to a spaced position, yarn guiding means intermediate said feeding members and the spool support, and shiftable from yarn guiding position to a position adjacent said feeding members, and means having a common control for effecting said relative movement of said feeding members and for shifting said guiding means.

49. In mechanism of the class described, in combination, a machine framing, a spool support thereon, a plurality of rotary yarn-feeding members, said members being supported for relative bodily movement from yarn feeding position to a spaced position, yarn guiding means intermediate said feeding members and the spool support, and shiftable from yarn guiding position to a position adjacent said feeding members, means to effect said relative movement of said feeding members, and means to shift said guiding means.

50. In winding mechanism for the tuft yarn-spools of moquette and like pile fabric looms, means for rotatably supporting a spool to be wound, and a yarn guide adapted to rest against the body of yarn formed on the spool and to be moved outwardly from the axis of the spool by the body of yarn thereon as it increases.

51. In a pattern setting machine, a power-receiving element, means rotatably to support a spool, spool rotating gear means, rotary means for feeding the yarns, and driving connections between said element, said spool rotating gear means, and said feeding means, said connections including mechanism whereby the rate of feed of said feeding means is increased proportionately to the increase in diameter of the yarn body forming on the spool.

52. In a pattern setting machine, a power-receiving element, means rotatably to support a spool, spool rotating gear means, rotary means for feeding the yarns, and driving connections between said element, said spool rotating gear means, and said feeding means, said connections including mechanism whereby the rate of feed and the rate of spool rotation are varied relatively to each other and in proportion to the increase in diameter of the yarn body forming on the spool.

In testimony whereof, I have signed my name to this specification.

BICKNELL HALL.

In testimony whereof, I have signed my name to this specification.

EDGAR F. HATHAWAY.

CERTIFICATE OF CORRECTION.

Patent No. 1,752,738.                                      Granted April 1, 1930, to

BICKNELL HALL ET AL.

It is hereby certified that error appears in the printed specification of the above numbered patent requiring correction as follows: Page 7, line 30, claim 8, after the word "package" insert the words "on the"; and that the said Letters Patent should be read with this correction therein that the same may conform to the record of the case in the Patent Office.

Signed and sealed this 24th day of June, A. D. 1930.

(Seal)

M. J. Moore,
Acting Commissioner of Patents.